United States Patent
Kennedy

(10) Patent No.: US 10,197,175 B2
(45) Date of Patent: Feb. 5, 2019

(54) HYDROSTATIC TANK FLOOR RELIEF VALVE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 20 days.

(21) Appl. No.: 15/491,440

(22) Filed: Apr. 19, 2017

(65) Prior Publication Data

US 2017/0219110 A1   Aug. 3, 2017

Related U.S. Application Data

(63) Continuation-in-part of application No. 14/546,302, filed on Nov. 18, 2014.

(51) Int. Cl.

| | |
|---|---|
| *F16K 17/12* | (2006.01) |
| *A47J 27/09* | (2006.01) |
| *E03B 3/02* | (2006.01) |
| *E04H 4/14* | (2006.01) |
| *F16K 15/02* | (2006.01) |
| *F16K 15/06* | (2006.01) |
| *B01D 35/02* | (2006.01) |

(Continued)

(52) U.S. Cl.
CPC ............ *F16K 17/12* (2013.01); *A47J 27/09* (2013.01); *B01D 35/02* (2013.01); *E03B 3/02* (2013.01); *E04H 4/14* (2013.01); *F16K 15/023* (2013.01); *F16K 15/06* (2013.01); *F16K 17/164* (2013.01); *B01D 2201/02* (2013.01); *B01D 2201/295* (2013.01); *B01D 2201/4015* (2013.01); *B01D 2201/4023* (2013.01); *E03C 1/264* (2013.01); *E03F 5/041* (2013.01); *Y10S 249/03* (2013.01); *Y10T 137/792* (2015.04); *Y10T 137/794* (2015.04)

(58) Field of Classification Search
CPC ........ F16K 17/12; F16K 15/06; F16K 15/023; A47J 27/09; E04H 4/14; E04H 3/02; Y10S 249/03; B01D 2201/02; B01D 2201/305; B01D 2201/4084; B01D 35/02; B01D 2201/295; B01D 2201/4015; Y10T 137/792; Y10T 137/794
See application file for complete search history.

(56) References Cited

U.S. PATENT DOCUMENTS 2,633,149 A   3/1953   McKenna
4,120,792 A * 10/1978   Clark .................... B01D 29/23
                                                  210/200

(Continued)

*Primary Examiner* — Atif H Chaudry
(74) *Attorney, Agent, or Firm* — Brown & Michaels, PC

(57) ABSTRACT

A hydrostatic tank floor relief valve of a construction described herein provides for equalization of hydrostatic pressure of fluid in a storage tank with hydrostatic pressure of ground water surrounding the storage tank. A high efficiency grate located in a flow channel of the hydrostatic tank floor relief valve blocks debris from entering the storage tank during pressure equalization, yet does not reduce effective flow rates through a flow channel of a given diameter. The hydrostatic tank floor relief valve optionally includes an elastomeric seal surface and a stainless steel seat ring that reduce the likelihood of particulate matter disrupting valve operation, and provide a more reliable seal.

9 Claims, 9 Drawing Sheets

(51) Int. Cl.
*F16K 17/164* (2006.01)
*E03F 5/04* (2006.01)
*E03C 1/264* (2006.01)

(56) References Cited

U.S. PATENT DOCUMENTS

| | | | |
|---|---|---|---|
| 4,441,658 A | | 4/1984 | Szkaradek |
| 5,266,194 A | * | 11/1993 | Chiodo ................ B01D 29/111 |
| | | | 210/232 |
| 5,341,523 A | | 8/1994 | Barnes |
| 7,549,439 B2 | | 6/2009 | Kimura et al. |
| 2006/0006105 A1 | * | 1/2006 | Bergstrom ............. B01D 35/30 |
| | | | 210/167.11 |
| 2008/0169228 A1 | * | 7/2008 | Ventura ................... E03C 1/264 |
| | | | 210/164 |
| 2008/0251470 A1 | * | 10/2008 | Kent ........................ E03F 1/00 |
| | | | 210/791 |
| 2015/0052674 A1 | | 2/2015 | Mewett et al. |

\* cited by examiner

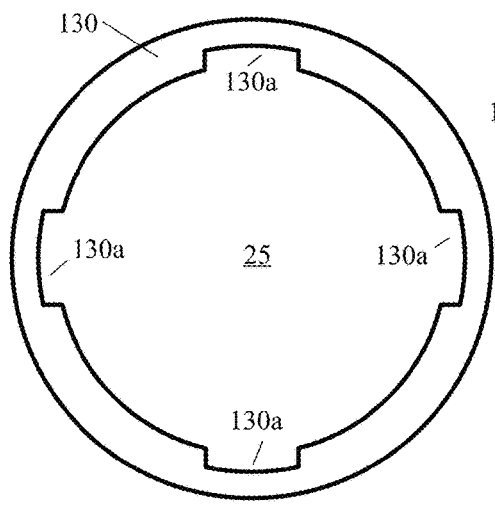
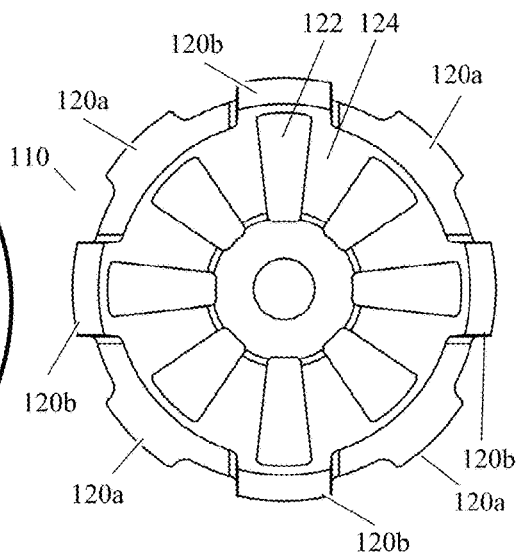
FIG. 6A  FIG. 6B
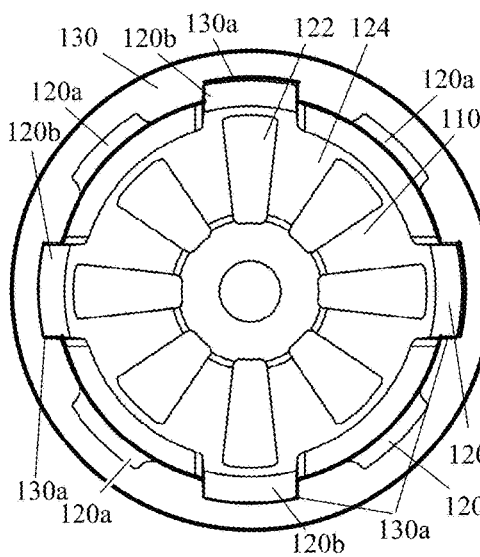
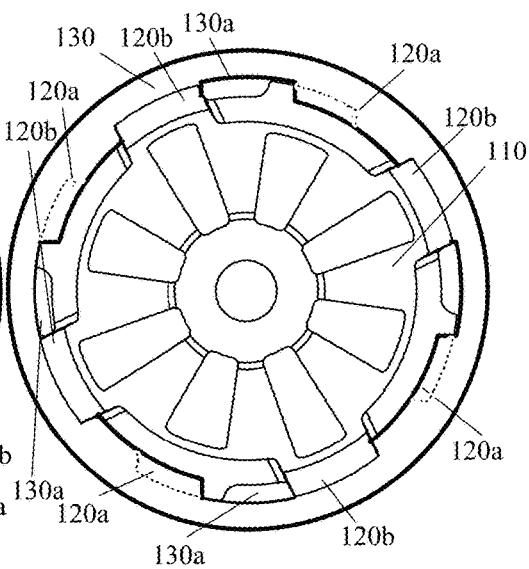
FIG. 6C  FIG. 6D

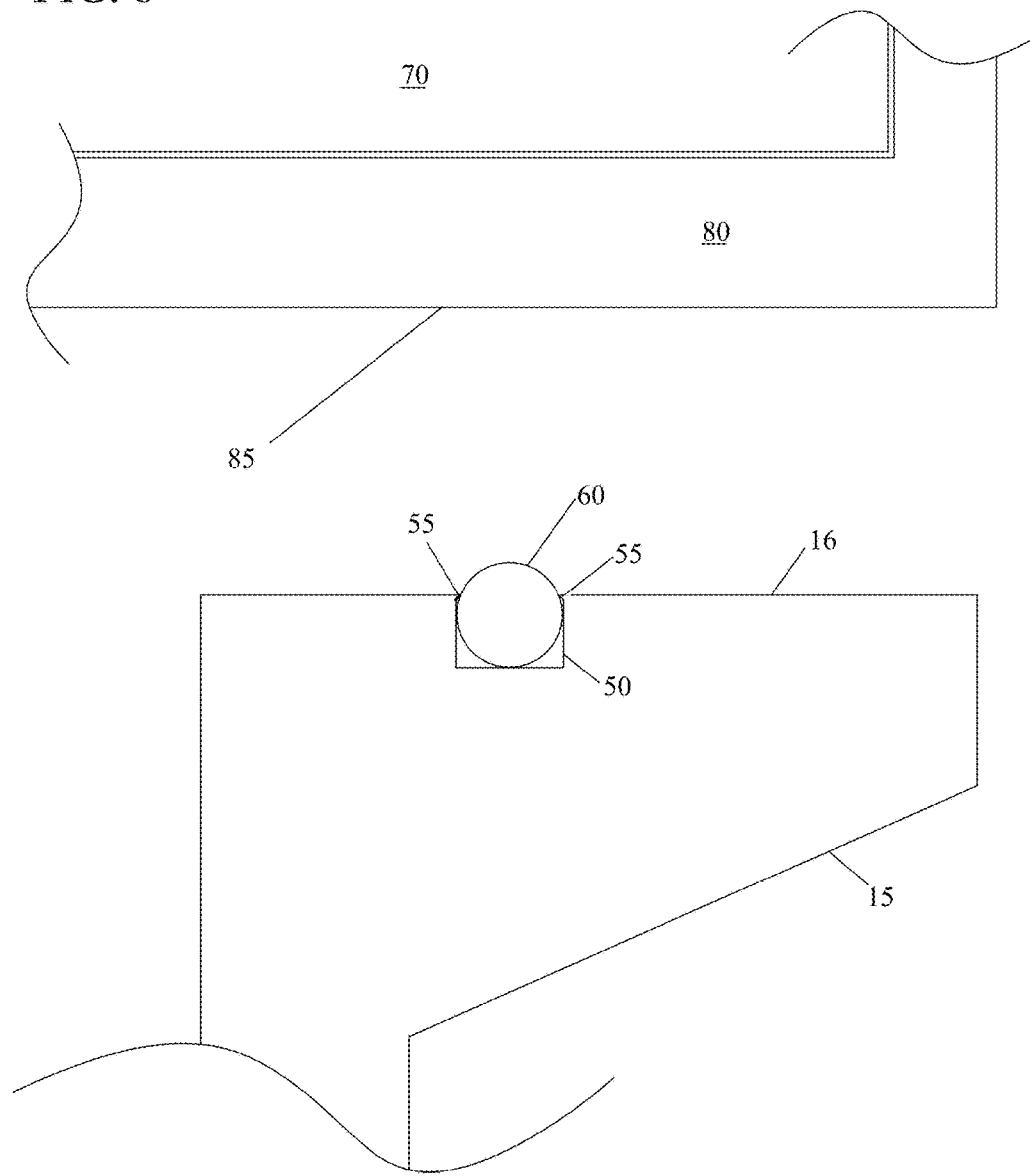

HYDROSTATIC TANK FLOOR RELIEF VALVE

REFERENCE TO RELATED APPLICATIONS

This is a continuation-in-part patent application of copending U.S. application Ser. No. 14/546,302, filed Nov. 18, 2014, entitled "HYDROSTATIC TANK FLOOR RELIEF VALVE". The aforementioned application is hereby incorporated herein by reference.

BACKGROUND OF THE INVENTION

Field of the Invention

The invention pertains to the field of hydrostatic tank floor relief valves. More particularly, the invention pertains to hydrostatic tank floor relief valves having a grate for blocking debris.

Description of Related Art

Various types of storage tanks may be buried underground, or partially underground, and heavy rains or flooding may saturate soils and raise the level of ground water so that the ground water surrounds the storage tank. As a result, if the storage tank is empty, partially empty, or contains a fluid that has a lower density than water, the storage tank may become buoyant. The buoyant forces acting on the tank may be sufficiently strong to cause the storage tank to "float", and erupt out of the ground when buried, or out of a partially buried state. Storage tank float is undesirable not only because it disrupts tank placement, but also because piping that is attached to the storage tank may split or break, and allow the contents of the storage tank to spill from the storage tank, and possibly contaminate soil and ground water.

Storage tanks constructed of concrete, for example, are also generally sensitive to buoyant forces and may crack and fail over time due to repeated exposure to potentially uneven distributions of buoyant forces as ground water levels rise and fall, even when those buoyant forces are not sufficient to cause the storage tank to fully float or erupt from the ground.

Tank float is a major concern when storage tanks are used to hold gasoline, oil, or other fluids that pose a significant contamination hazard. Anchoring structures for these types of storage tanks exist in the prior art, but these anchoring approaches can increase installation costs and complexity, and may be best suited to storage tanks that contain fluids that also need to be protected from ground water infiltration.

Other storage tanks, such as waste water storage tanks or septic tanks, need only prevent the contents of the tank from escaping into surrounding soil, and may freely accept rain water or ground water in addition to the biologically contaminated fluids they store. In these types of storage tanks, hydrostatic tank floor relief valves are integrated into storage tank construction to relieve buoyant forces and prevent tank float.

In the prior art, a hydrostatic tank floor relief valve generally includes a valve body that is, for example, incorporated into the bottom of a concrete holding tank during concrete pouring operations, whether that tank will eventually be completely buried, or remain partially above ground. The valve body has an external shape that anchors the valve body into the concrete floor of the storage tank, and also prevents leakage of fluids between the valve body and surrounding concrete, or other storage tank construction materials.

The valve body has a first end below the level of the storage tank floor that may be connected to a polyvinylchloride (PVC), cast iron, steel, or other type of pipe that is exposed to the water table when the water table rises to the bottom of the storage tank. A second end of the valve body, located inside the storage tank at the bottom of the storage tank, is generally sealed by a massive valve cover which may also include a gasket material between the valve cover and the valve body. The weight of the valve cover, and the hydrostatic pressure of fluids contained in the storage tank, hold the hydrostatic tank floor relief valve in a closed positon when ground water levels are below the bottom of the tank. Thus, the contents of the storage tank are prevented from escaping the storage tank.

Ground water levels which rise above the level of the bottom of the storage tank may cause a significant increase in the hydrostatic pressure of ground water below the storage tank at the first end of the valve body. When the hydrostatic pressure of ground water exceeds the hydrostatic pressure of the fluid contained in the storage tank, a pressure differential forms and forces the valve cover away from the valve body, allowing ground water to flow into the storage tank until the pressure differential is equalized. Buoyant forces are thus relieved, and tank float is prevented.

Hydrostatic tank floor relief valves also generally include a screen in the form of a disk with apertures placed in the valve body between the valve cover and the second end of the valve body. The screen may be provided with slots, perforations, holes, or other apertures that allow ground water to flow into the storage tank, but prevent gravel, stones, or other debris beneath the storage tank from infiltrating into the storage tank when ground water moves through the hydrostatic tank floor relief valve into the storage tank.

In the prior art, hydrostatic tank floor relief valve screens have a planar geometry with a number of perforations or apertures. An internal flow channel of the hydrostatic tank floor relief valve may have a given diameter, for example 2 inches or 4 inches, and a corresponding cross-sectional area. A total of the areas of all the apertures defined by the screen structure is necessarily smaller than the cross-sectional area of the internal flow channel of the hydrostatic tank floor relief valve because the structure of the screen defining the apertures blocks a portion of the flow channel. As a result, the effective cross-sectional area of the flow channel is reduced by the presence of the screen.

FIG. 1A shows a top view of a prior art screen 2 and FIG. 1B shows a side view of the prior art screen 2. The prior art screen 2 is a disk made of cast iron with a thickness T, and is provided with a series of slots 3 that that pass through solid portions 4 of the disk. A ring 5 surrounds the screen 2 to fit into the valve. The slots 3 allow fluid to flow through the prior art screen 2, but prohibit the passage of gravel and other debris. Notches 6 are formed in the prior art screen 2 to allow the prior art screen 2 to be mounted in a hydrostatic tank floor relief valve, as described in detail below.

FIG. 2A and FIG. 2B show a prior art hydrostatic tank floor relief valve body 200 with a flow channel 230. The valve body 200 includes a screen flange 210 that extends inwardly toward the flow channel 230 about an internal circumference of the flow channel 230. Additionally, screen locks 220 are provided adjacent the screen flange 210, and form tabs or posts extending into the flow channel 230. The screen locks 220 are dimensioned and oriented so that the notches 6 in the prior art screen 2 may pass the screen locks 220 when the screen 2 is properly oriented. Thus, the screen 2 may be inserted into the flow channel 230, past the screen locks 220, and be held in the flow channel 230 by the screen flange 210. As shown in FIG. 2B, when the prior art screen 2 is positioned against the screen flange 210, the prior art screen 2 may be rotated, for example one quarter turn, so that the notches 6 and screen locks 220 are no longer in alignment, and the ring 5 of the prior art screen 2 is held between the screen flange 210 and the screen locks 220. Thus, the screen 2 is held in the flow channel 230 regardless of a fluid flow direction within the flow channel 230, and may be easily removed to allow cleaning and maintenance of the hydrostatic tank floor relief valve.

Prior art cast iron screens 2 are effective, but the casting process increases manufacturing costs. Furthermore, as can be seen from FIG. 1A, for a flat disk prior art screen 2 with a diameter d, and an area $A_{P4G}=\pi r^2$, the slots 3 of the prior art screen 2 only allow fluid to pass through a limited portion of the area of the prior art screen 2, flow through the prior art screen 2 being blocked by the screen ring 5 and the solid portion 4. Since the flow channel 230 of the valve is a cylinder which also has a diameter d, the only available area left for fluid flow—the open slots 3—is, by necessity, much less than the full area of the flow channel. Thus, the prior art screen 2 reduces the flow efficiency of a hydrostatic tank floor relief valve.

In addition, due to the large tolerances necessary in metal castings, the prior art screen 2 has a large amount of play between the screen flange 210 and the screen locks 220. This play may allow the prior art screen 2 to move, and even rotate, when fluid flows through the flow channel 230 and debris impacts the prior art screen 2. Over time, motion of the prior art screen 2 may cause the notches 6 to orient with the screen locks 220 so that the prior art screen 2 is no longer held against the screen flange 210. Thus, the prior art screen 2 may cease to function, and may interfere with the overall function of the hydrostatic tank floor relief valve.

A reduction of the effective cross-sectional area of the flow channel limits the rate at which ground water may pass through the hydrostatic tank floor relief valve into the storage tank. Multiple hydrostatic tank floor relief valves may therefore be required to adequately react to high rates of change in ground water levels. Alternatively, the internal diameter of the hydrostatic tank floor relief valve, and the internal diameter of pipes connected to the hydrostatic tank floor relief valve must be increased to adequately respond to high rates of change in ground water levels. Both solutions increase tank construction costs.

Prior art seats generally rely on a mating of two planar surfaces to form a seal between the valve cover and the hollow valve body when the hydrostatic tank floor relief valve is in a closed position. However, particulate matter may settle to the tank floor, or enter the tank through the hydrostatic tank floor relief valve when it is in an open position, and may become trapped between the two planar surfaces, thus reducing the effectiveness of the seal formed by the two planar surfaces.

SUMMARY OF THE INVENTION

A hydrostatic tank floor relief valve of a construction described herein provides for equalization of hydrostatic pressure of fluid in a storage tank with hydrostatic pressure of ground water surrounding the storage tank. A high efficiency grate located in a flow channel of the hydrostatic tank floor relief valve blocks large debris such as rocks from entering the storage tank during pressure equalization. The grate is in the form of a cone or truncated cone, with solid bars interspersed with apertures, the total area of the apertures being at least equal to the cross-sectional area of the valve, and preferably is larger. Thus, the grate stops rocks but allows smaller particulate matter to pass, and does not reduce effective flow rates through a flow channel of a given diameter. The hydrostatic tank floor relief valve optionally includes an elastomeric seal surface and a stainless steel seat ring that reduce the likelihood of particulate matter disrupting valve operation, and provide a more reliable seal.

BRIEF DESCRIPTION OF THE DRAWING

FIG. 6A shows a top view of a grate flange.

FIG. 6B shows a top view of a grate with grate retaining tabs.

FIG. 6C shows a top view of a grate flange and a grate with retaining tabs passing through the grate flange.

FIG. 6D shows a top view of a grate flange and a grate retaining tabs, the grate being rotated so that the tabs engage the grate flange.

FIG. 8 shows a detail of a hydrostatic tank floor relief valve seat ring, as shown in the dotted lines 8 in FIG. 4.

DETAILED DESCRIPTION OF THE INVENTION

A hydrostatic tank floor relief valve of a construction described herein includes a high volume grate formed by a plurality of solid bars interspersed with apertures. The grate may be in the form of a cone, or a truncated cone with a bottom portion having holes for fluid flow. The truncated cone grate encompasses a larger surface area than prior art screens, which were formed of plates perforated by a plurality of relatively small holes.

The bars of the grate are formed to be rigid and strong enough to prevent passage of rocks and other large debris, while the apertures are large enough to allow small particles to pass through the grate. The total area defined by all of the apertures of the grate are dimensioned to be at least as large as the cross-sectional area of a flow channel of a hydrostatic tank floor relief valve, and preferably are defined so that the total area is larger than the cross-sectional area. As a result, the truncated cone grate effectively prevents larger debris from passing through the hydrostatic tank floor relief valve, but does not significantly restrict flow rates for water and small particulates through the hydrostatic tank floor relief valve.

The high volume grate is provided with two sets of grate retaining tabs that lock the grate in place on a grate flange.

In addition, the hydrostatic tank floor relief valve of a construction described herein may include a stainless steel seat ring embedded in a channel of a seat flange of a hydrostatic tank floor relief valve hollow valve body. The seat ring engages an elastomeric boot covering a valve cover when the valve cover is in a closed position on the seat flange. The seat ring described herein provides an improved seal that is less susceptible to interference from particulate matter. The elastomeric boot and the seal ring may also be replaced in the event of damage without having to replace the entire hydrostatic tank floor relief valve.

Figure 1A:
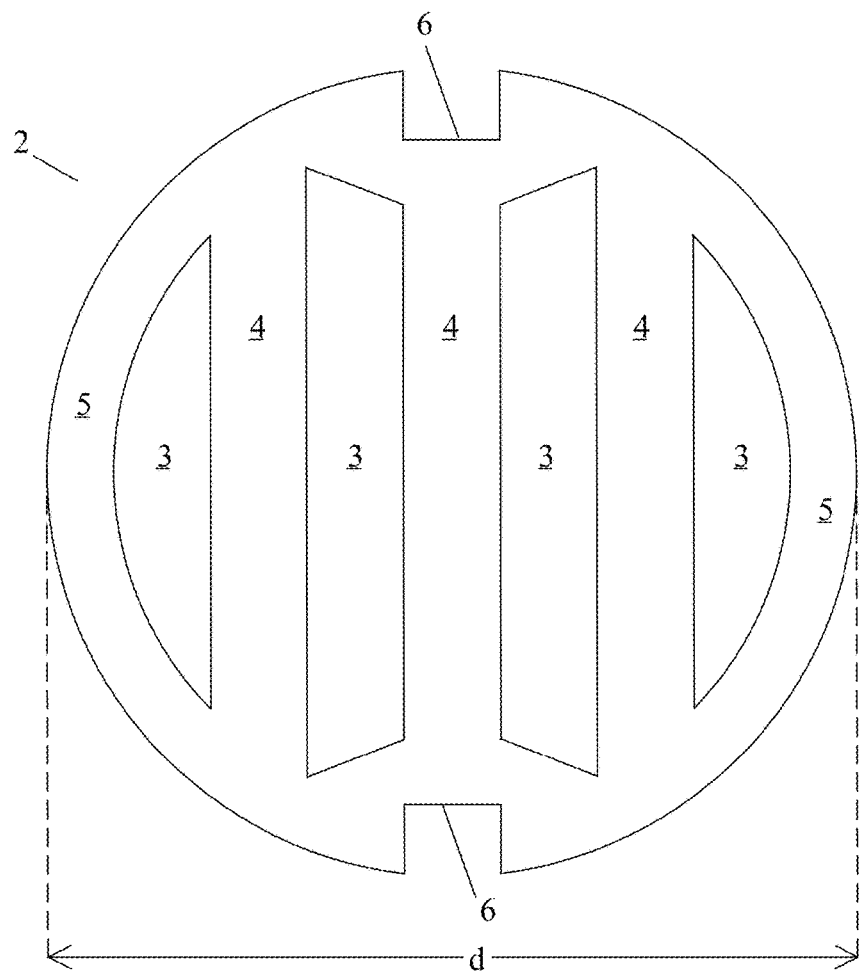
FIG. 1A shows a top view of a prior art tank floor relief valve screen.
Figure 1B:
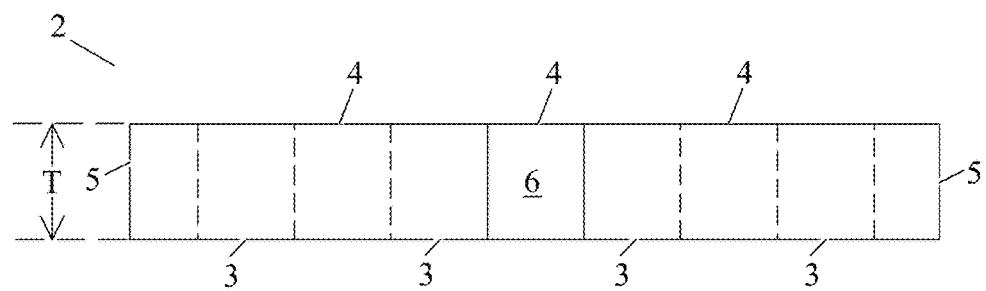
FIG. 1B shows a side view of a prior art tank floor relief valve screen.
Figure 2A:
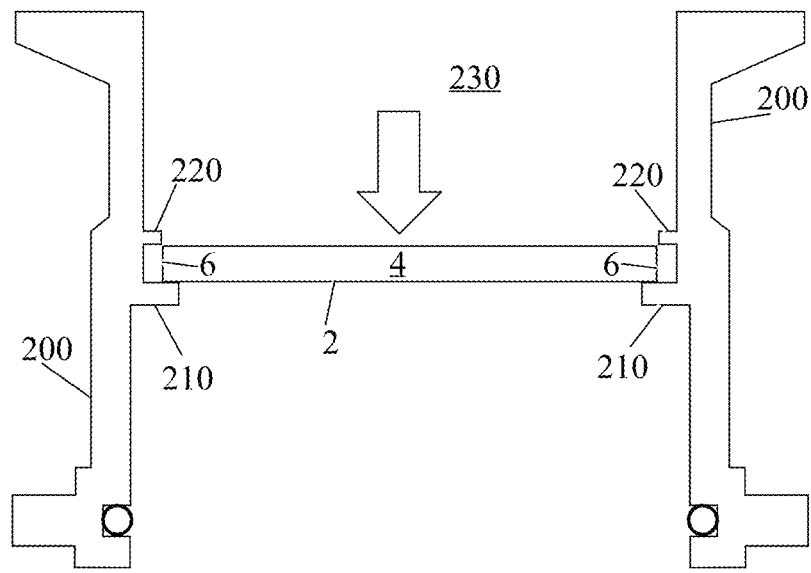
FIG. 2A shows a side view a prior art tank floor relief valve body with a prior art screen placed in a flow channel.
Figure 2B:
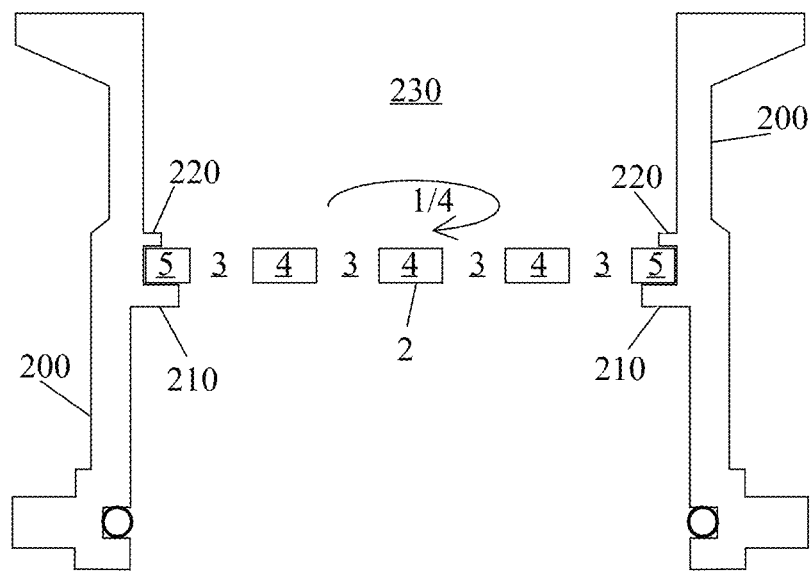
FIG. 2B shows a side view a prior art tank floor relief valve body with a prior art screen locked in a flow channel.
Figure 3:
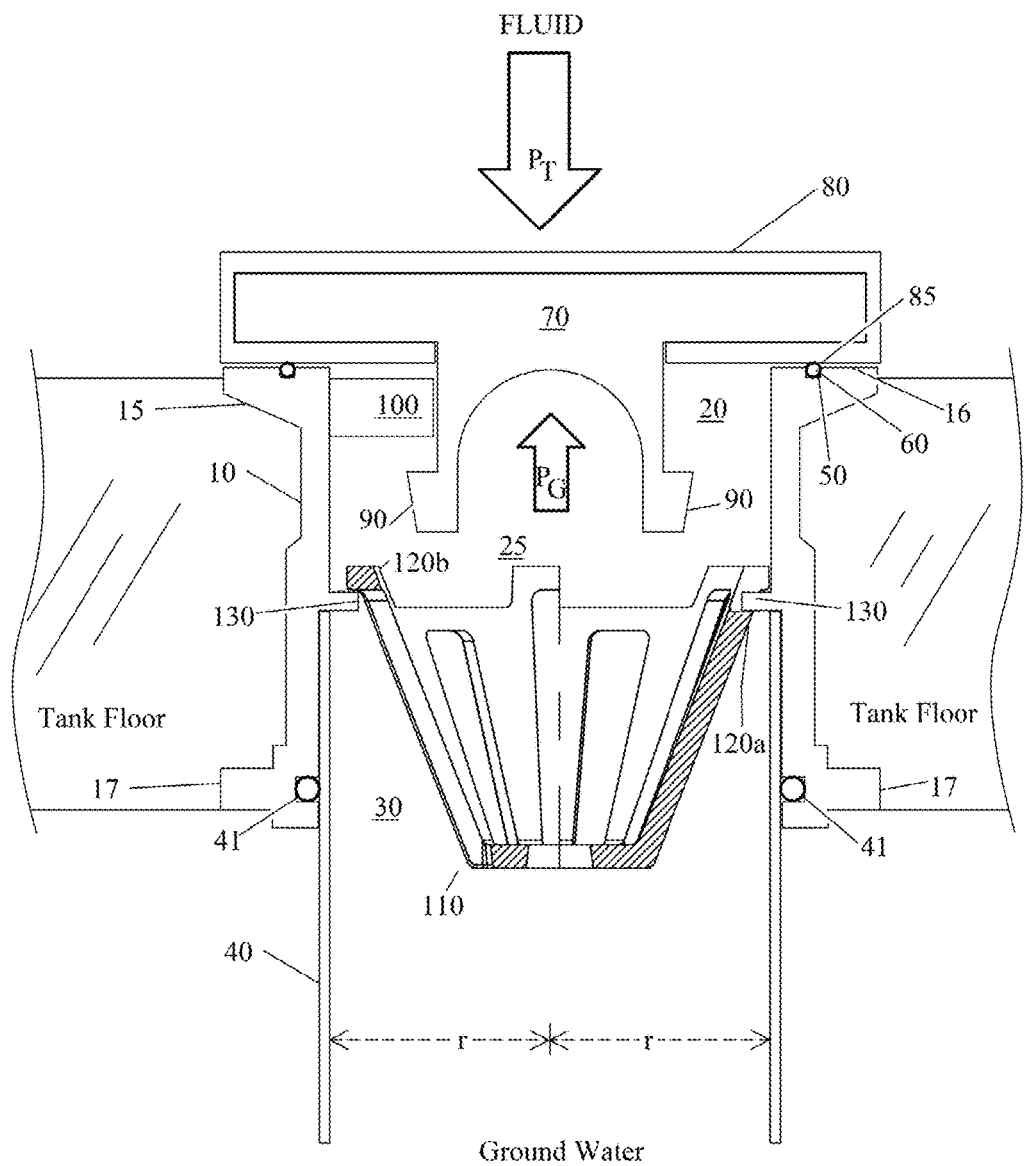
FIG. 3 shows a hydrostatic tank floor relief valve in a closed position, equipped with a truncated cone grate.

FIG. 3 shows a hydrostatic tank floor relief valve in a closed position. The hydrostatic tank floor relief valve includes a hollow valve body 10 with an inlet 30 and an outlet 20. A pipe 40, made of polyvinyl chloride (PVC), steel, cast iron or other material, is inserted into the inlet 30 of the hollow valve body 10 and sealed with an O-ring 41 or other suitable connection that prevents leakage between the hollow valve body 10 and the pipe 40. A seat flange 15 and an inlet flange 17 extend radially outward from the hollow valve body 10, and secure the hollow valve body 10 to the tank floor.

The seat flange 15 is located at the outlet 20 of the hollow valve body 10, and provides a seat surface 16 that includes a seat ring 60. The seat ring 60 is also shown in detail in FIG. 8. A channel 50 is formed in the seat surface 16 of the seat flange 15 for accepting the seat ring 60. The channel 50 is generally annular and concentric to the outlet 20 of the hollow valve body 10.

The seat ring 60 and the channel 50 are dimensioned so that the seat ring 60 is securely held in the channel 50 by pressing the seat ring 60 into the channel, and/or creating a bead 55 or other deformation along one or both sides of the channel 50 to retain the seat ring 60 in the channel 50. In one embodiment, the seat ring 60 is made of stainless steel to provide strength and corrosion protection. However, any suitable material may be substituted for stainless steel, for example, to accommodate different fluid properties. The channel 50 in the seat surface 16 may be formed during casting of the hollow valve body 10, or may be machined into the seat surface 16 during finishing operations on the hollow valve body 10. Although the seat ring 60 is shown with a circular cross-sectional profile, other geometries are also acceptable provided they are capable of mating with the seal surface 85.

A valve cover 70 is located at the outlet 20 of the hollow valve body 10. The valve cover 70 is covered with an elastomeric boot 80 which provides a seal surface 85 at a side of valve cover 70 facing the seat flange 15. Thus, when the valve cover 70 is in a closed position and pressed onto the seat flange 15 by its own mass and hydrostatic pressure $P_T$ of fluid in the tank acting on the valve cover 70, the seat ring 60 is pressed on to the seal surface 85, creating a positive seal as the elastomeric material of the elastomeric boot 80 conforms to the seal ring 60. The elastomeric boot 80 is made of ethylene propylene diene monomer (EPDM) rubber in one embodiment and is removably fitted to the valve cover 70 to facilitate ease of replacement if necessary. However, other elastomeric compounds may be substituted for EPDM in other embodiments, and the elastomeric boot 80 may take other forms or be permanently attached to the valve cover 70, provided a seal surface 85 is formed on the valve cover 70.

Figure 4:
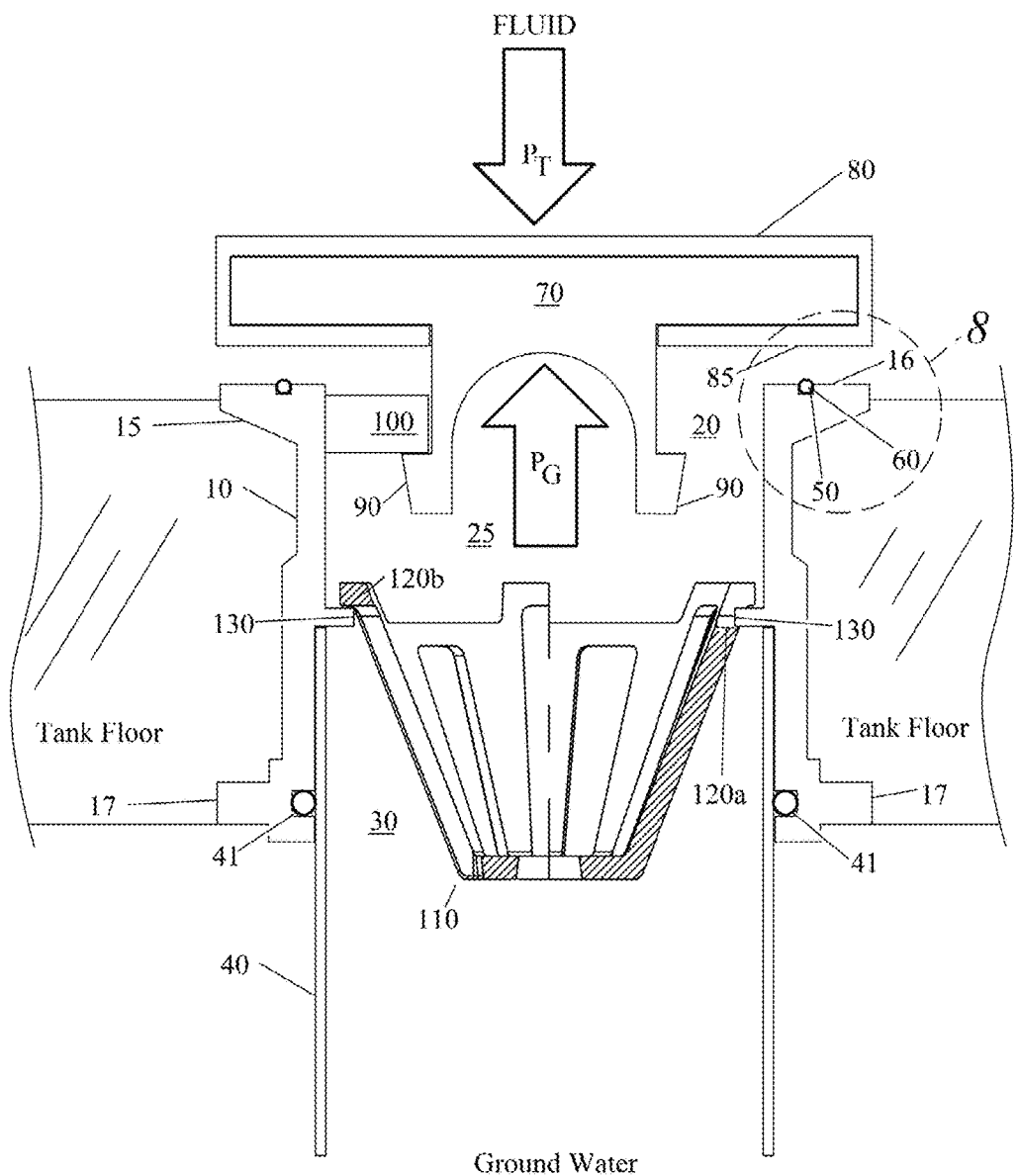
FIG. 4 shows a hydrostatic tank floor relief in an open position, equipped with a truncated cone grate.

The valve cover 70 is movable by ground water pressure from the closed position, shown in FIG. 3, to an open position shown in FIG. 4. In these figures the valve cover 70 includes retaining tabs 90 that project into the outlet 20 of the hollow valve body 10. The retaining tabs 90 are spaced about an inner diameter of the valve cover 70, and pass through mating gaps in a valve cover lock 100 that protrudes inwardly from an inner surface of the hollow valve body 10 adjacent to the outlet 20. Thus, when the valve cover 70 is inserted into the outlet 20 of the hollow valve body 10 and rotated, the gaps in the valve cover lock 100 no longer mate with the retaining tabs 90, and motion of the valve cover 70 away from the outlet 20 is limited by a length of the retaining tabs 90.

A grate 110 is located in the hollow valve body 10 in a flow channel 25 between the outlet 20 and the inlet 30, and is attached to a grate flange 130. As shown in FIG. 6A, the grate flange 130 is an annular ring with gaps 130a spaced about an inner circumference that is open to the flow channel 25.

Figure 6E:
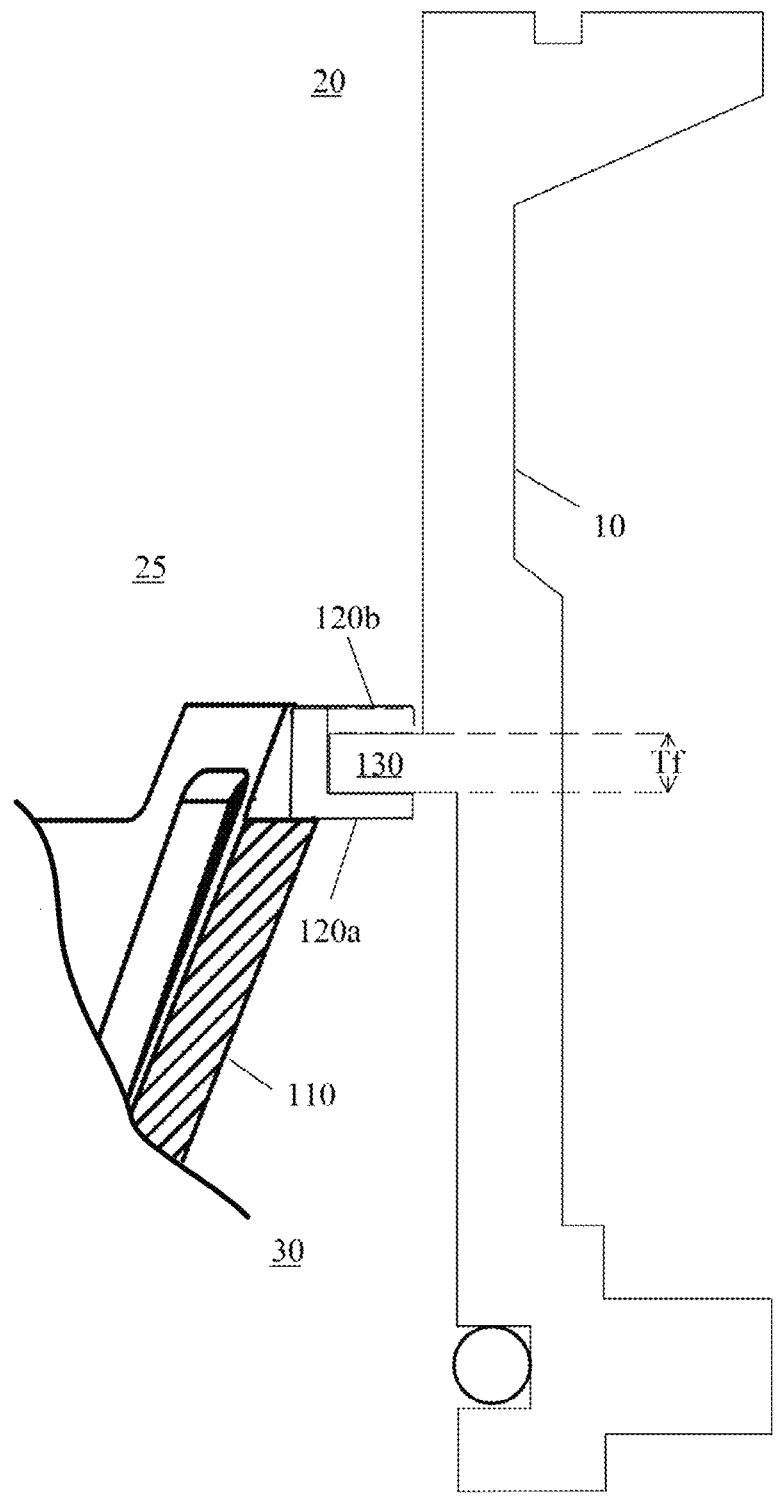
FIG. 6E shows a detail of grate retaining tabs engaging the grate flange.
Figure 7A:
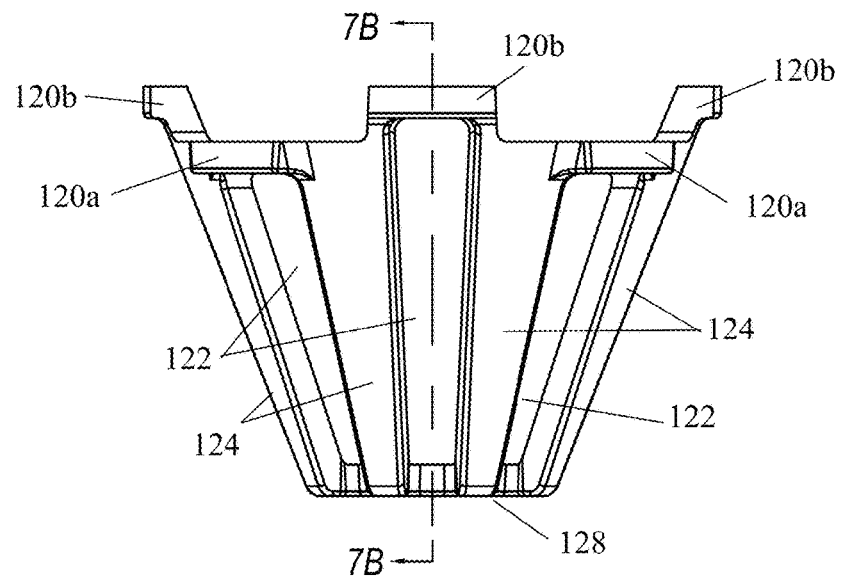
FIG. 7A shows a side view of a truncated-cone grate.
Figure 7B:
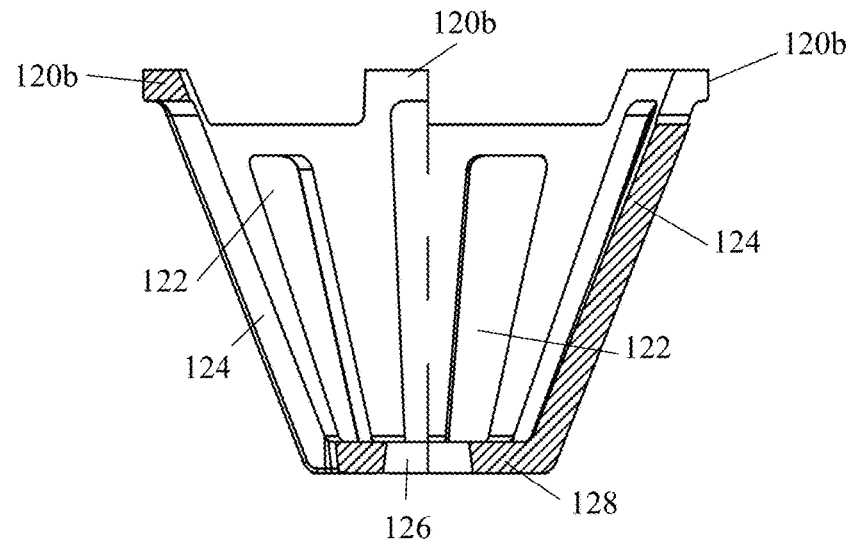
FIG. 7B shows a cut-through view of the grate of FIG. 7A along the lines 7B-7B.

As shown in FIG. 6B, a top edge of the grate 110 includes a first series of retaining tabs 120a that protrude radially from the grate 110. A second set of retaining tabs 120b also protrude radially from the grate 110, and alternate in location with the first set of retaining tabs 120a. As shown in FIG. 6E, the first set of retaining tabs 120a are offset toward an inlet 30 end of the grate 110, and the second set of retaining tabs 120b are offset toward an outlet 20 end of the grate 110 such that the first set of retaining tabs 120a and the second set of retaining tabs 120b are separated by a distance approximately equal to a thickness Tf of the grate flange 130.

The grate 110 may be inserted into outlet 20 of the hollow valve body 10, and when properly oriented, as shown in FIG. 6C, the first set of retaining tabs 120a may pass through the gaps 130a in the grate flange 130, while the second set of retaining tabs 120b are blocked by the grate flange 130, stopping further insertion of the grate 110 into the hollow valve body 10.

As shown in FIG. 6D, when the grate 110 is then rotated, the first set of retaining tabs 120a is oriented at an inlet 30 side of the grate flange 130, while the second set of retaining tabs 120b is oriented at the an outlet 20 side of the grate flange 130. Thus, the grate flange 130 is held between the first set of retaining tabs 120a and the second set of retaining tabs 120b. In this manner, motion of the grate 110 toward either the outlet 20 of the hollow valve body 10 or the inlet 30 of the hollow valve body 10 is prevented.

Additionally, the first set of retaining tabs 120a and the second set of retaining tabs 120b may be separated with close tolerances relative to the thickness of the grate flange 130, or provided with a structure that is lightly sprung with a bias toward the grate flange 130, so that the grate 110 is prevented from inadvertently rotating after installation. In some embodiments, the grate flange 130 may be provided with surface features such as indentations, protrusions, or detents that accept the first set of retaining tabs 120a and the second set of retaining tabs 120b after the grate 110 has been rotated so that the grate 110 may only be removed by intentional manual manipulation.

Figure 5:
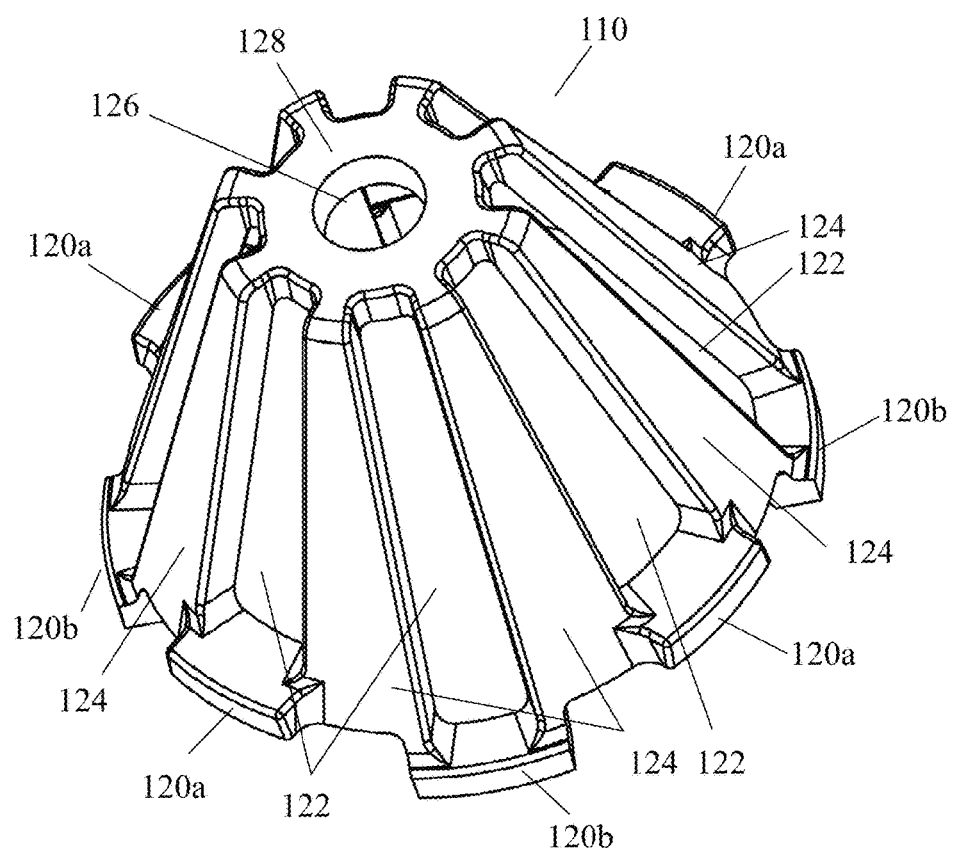
FIG. 5 shows a perspective view of a truncated cone grate.

FIG. 5 shows a perspective view of a truncated cone shaped grate 110 that more clearly illustrates the construction of the grate 110. In this example, the grate 110 has a cone section made up of solid bars 124, with apertures 122 in between each of the solid bars 124, and a bottom 128 with at least one hole 126. Each aperture 122 and hole 126 has an area which can be denoted as A(n), where n=1, 2, 3, ... N, where N is the number of apertures 122 and hole(s) 126.

Summing the area A(n) of all the apertures 122 and holes 126 in the grate 110 provides a total flow area $A_f$ through the grate calculated as:

$$A_f = \sum_{n=1}^{N} A(n)$$

The grate 110 is therefore constructed to provide a number of apertures with a total flow area $A_f$ that is at least as large as the cross-sectional area $A_p$ of the pipe 40 bringing ground water to the inlet 30, calculated as:

$A_p = \pi r^2$ (where r is the radius of pipe 40)

Provided $A_f \geq A_p$, the grate 110 will not significantly restrict fluid flow from the inlet 30 to the outlet 20.

In operation, the hydrostatic tank floor relief valve is held in a closed position, illustrated in FIG. 3, by hydrostatic fluid pressure $P_T$ of fluid contained in the tank. When ground water levels rise, water enters the pipe 40, passes through the grate 110, and ground water hydrostatic pressure $P_G$ acts on the valve cover 70 at the outlet 20. When ground water hydrostatic pressure $P_G$ exceeds the hydrostatic fluid pressure $P_T$ of fluid contained in the tank, as shown in FIG. 4, a pressure differential is created, ground water forces the valve cover 70 away from the seat flange 15, and flows into the tank. When ground water hydrostatic pressure $P_G$ and hydrostatic fluid pressure $P_T$ of fluid contained in the tank equalize, the valve cover 70 moves under the force of gravity and the weight of the valve cover 70 back toward the seal flange 15, closing the hydrostatic tank floor relief valve.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydrostatic tank floor relief valve, comprising:
    a hollow valve body with an inlet coupled to a first end of a pipe passing through a bottom of the tank, an outlet inside the tank, a flow channel between the inlet and the outlet, and a seat flange with a seat surface adjacent to the outlet;
    a valve cover at the outlet of the hollow valve body, the valve cover having a seal surface, movable from a closed position with the seal surface in contact with the seat surface of the seat flange, to an open position with the seal surface separated from the seat surface of the seat flange;
    a grate mounted in the flow channel of the hollow valve body, comprising a plurality of protruding tabs and a conical body formed by a plurality of solid bars interspersed with a plurality of apertures, each aperture of the plurality of apertures having an area, and a sum of the areas of the plurality of apertures being greater than or equal to a cross-sectional area of the pipe; and
    a grate flange having a plurality of gaps and extending radially into the flow channel,
    the plurality of protruding tabs mating with the plurality of gaps in the grate flange, the plurality of protruding tabs on the grate being rotatable on the grate flange to lock the grate in place on the grate flange, the plurality of protruding tabs including a first set of retaining tabs and a second set of retaining tabs, the tabs of the first set of retaining tabs and the tabs of the second set of retaining tabs alternating in location, the first set of retaining tabs offset toward the inlet, and the second set of retaining tabs offset toward the outlet, such that the first set of retaining tabs and the second set of retaining tabs are separated by a distance approximately equal to a thickness of the grate flange.

2. The hydrostatic tank floor relief valve of claim 1, wherein the seal surface of the valve cover comprises an elastomeric material.

3. The hydrostatic tank floor relief valve of claim 1, wherein the seat surface of the seat flange comprises a seat ring held in a channel formed in the seat surface of the seat flange.

4. The hydrostatic tank floor relief valve of claim 3, wherein the seat ring is stainless steel.

5. The hydrostatic tank floor relief valve of claim 1, wherein the conical body of the grate further comprises a bottom having at least one hole, such that the grate forms a truncated cone.

6. The hydrostatic tank floor relief valve of claim 1, wherein each aperture of the grate extends an entire span between adjacent solid bars.

7. A grate for a hydrostatic tank floor relief valve having a hollow valve body with an inlet coupled to a first end of a pipe passing through a bottom of the tank, an outlet inside the tank, a flow channel between the inlet and the outlet, a seat flange with a seat surface adjacent to the outlet, and a grate flange having a plurality of gaps and extending radially into the flow channel, the grate comprising:
    a conical body formed by a plurality of solid bars interspersed with a plurality of apertures, each aperture of the plurality of apertures having an area, and a sum of the areas of the plurality of apertures being greater than or equal to a cross-sectional area of the pipe; and
    a plurality of protruding tabs configured to mate with the plurality of gaps in the grate flange, the plurality of protruding tabs on the grate being rotatable on the grate flange to lock the grate in place on the grate flange, the plurality of protruding tabs including a first set of retaining tabs and a second set of retaining tabs, the tabs of the first set of retaining tabs and the tabs of the second set of retaining tabs alternating in location, the first set of retaining tabs offset toward the inlet, and the second set of retaining tabs offset toward the outlet, such that the first set of retaining tabs and the second set of retaining tabs are separated by a distance approximately equal to a thickness of the grate flange.

8. The grate of claim 7, wherein the conical body of the grate further comprises a bottom having at least one hole, such that the grate forms a truncated cone.

9. The grate of claim 7, wherein each aperture extends an entire span between adjacent solid bars.

* * * * *